US006992980B2

(12) United States Patent
Brezzo et al.

(10) Patent No.: US 6,992,980 B2
(45) Date of Patent: Jan. 31, 2006

(54) SYSTEM AND METHOD FOR ENABLING A FULL FLOW CONTROL DOWN TO THE SUB-PORTS OF A SWITCH FABRIC

(75) Inventors: Bernard Brezzo, Nice (FR); Rene Gallezot, Vence (FR); Francois Le Maut, Nice (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 09/884,214

(22) Filed: Jun. 19, 2001

(65) Prior Publication Data

US 2002/0006110 A1   Jan. 17, 2002

(30) Foreign Application Priority Data

Jun. 20, 2000 (EP) .................................. 00480054

(51) Int. Cl.
*G01R 31/08* (2006.01)
(52) U.S. Cl. ...................................... 370/229; 370/235
(58) Field of Classification Search ................ 370/229, 370/230, 230.1, 231, 232, 233, 234, 235, 370/236, 236.1, 390, 413, 415, 417
See application file for complete search history.

(56) References Cited

U.S. PATENT DOCUMENTS

| 5,689,505 | A | * | 11/1997 | Chiussi et al. | ............... | 370/388 |
| 6,147,969 | A | * | 11/2000 | Benmohamed et al. | ..... | 370/230 |
| 6,646,985 | B1 | * | 11/2003 | Park et al. | ................... | 370/229 |
| 6,735,173 | B1 | * | 5/2004 | Lenoski et al. | ............. | 370/235 |

* cited by examiner

*Primary Examiner*—Phirin Sam
(74) *Attorney, Agent, or Firm*—Jay H. Anderson; James J. Cioffi (57) ABSTRACT

The invention permits an effective traffic flow control, down to all sub-ports, of a switch made of a N-port core switch fabric. Sub-ports concentrate traffic from lower speed lines to a switch fabric native port. In each sub-port adapter, when congestion is detected in the OUT leg, it is reported through the corresponding IN leg. Congestion is piggybacked over the incoming traffic entering the input port of the N-port core switching fabric and is broadcast so that all sub-ports become aware of the detected congestion in any of the sub-ports. Each sub-port adapter performs a checking of the congestion status of all the other sub-ports and acts to stop forwarding received traffic destined for congested sub-ports and holds further received traffic until the sub-ports are reported to be no longer congested. The full intrinsic performance of a N-port switch fabric is realized by concentrating, through port and sub-port adapters, the traffic of more than N independent lines.

27 Claims, 7 Drawing Sheets

Prior Art

Prior Art

SYSTEM AND METHOD FOR ENABLING A FULL FLOW CONTROL DOWN TO THE SUB-PORTS OF A SWITCH FABRIC

BACKGROUND OF THE INVENTION

The present invention relates to communications networks and more particularly, to the switching nodes of those networks implemented from very high-speed fixed-size packet switch fabrics.

In recent years, the explosive demand for bandwidth over communications networks has driven the development of very high-speed switching fabric devices, some resulting in commercial offerings. The practical implementation of network switching nodes, capable of handling aggregate data traffic in the range of hundredths of gigabits per second, and soon in terabits per second, is thus becoming feasible. While many different approaches are theoretically possible to carry out switching at network nodes, today's standard solution is to employ, irrespective of the higher communications protocols actually in use to link the end-users, fixed-size packet (also referred to as cell) switching devices. They are simpler and more easily tunable for performances than other solutions, especially those handling variable-length packets. Thus, N×N switches, which can be viewed as black boxes with N inputs and N outputs are made capable of moving fixed-size packets from any incoming link to any outgoing link.

An incoming link is connected to a switch fabric, indirectly, through an input port. In practice, there is a port adapter between the physical incoming link, e.g., a fiber optical connection, and the actual switch fabric input port, in order to adapt the generally complex physical protocol (and sometimes higher communications protocols as well) in use between switching nodes, to the particular switch fabric input port. Conversely, the interface between the switch fabric and the outgoing link is referred to as the output port and there is also an output adapter.

Irrespective of how the switching fabric core is actually devised and implemented this approach is characterized in that the switching fabric itself does not interface directly to any link external to the switching node. Therefore the interface between adapters and switch fabric, along with the corresponding part of the adapter, becomes an integral part of the switching node and a key parameter to consider for its architecture. Particularly, the connections between the adapters and the switch fabric is an area that requires careful design. Although, in general, it is preferable to use parallel connections as much as possible to keep cost down (since this allows the use of slower or current, i.e., inexpensive, chip technologies e.g., CMOS versus GaAs, for a same throughput) there is a number of rapidly limiting factors in this direction.

Building a very fast switch produces a large number of I/O connections since there is a multiplying factor i.e., the number of ports. A switching fabric is commonly a 16×16 or 32×32 switch which therefore has 16 or 32 fully bi-directional ports. In addition, parallel connections create a large number of wires to be handled, both on the backplane and for attaching to the switch fabric, forcing the use of expensive module and packaging solutions. Hence, to push switch performance, the other alternative is to increase speed within the limit of the chip technology in use. However, as both basic clock speed and the number of wires in each parallel connection increase, one soon starts to get problems with skew. That is, the signal on some paths arrives at a different time from the parallel signal on a different path.

Skew is a very serious limitation on the effective use of parallel connections and its control is a key design issue. Also exacerbating the problem, the drivers located at the periphery of the chip modules have to be made slower than those of the interior of the switch fabric because they have to drive higher value parasitic capacitors requiring switching more current through the parasitic inductance of the packaging and creating a problem known as simultaneous switching (ground is disturbed while drivers are toggling in synch), another drastic limitation to the use of many signal I/O's.

As a result of the above considerations, the number of wires allowed in each port, and the number of ports itself, of commercially available switch fabrics, are a careful tradeoff between the performances and limitations of the various components involved i.e., chip technology, chip packaging (module) technology and board technology, along with their respective costs in an attempt to reach the overall best cost/performance ratio for a switching node. As a consequence, a state of the art switch is a device having a maximum of a few tenths of ports e.g., 16 or 32, each having a few data I/O's per port e.g., 4 or 8 for input and the same for outputs (in order it exists practical solutions to control the skew). Also sometimes implementing a so- called 2-way data link bundling (two cells are moved IN and OUT simultaneously). And, since each port is toggled to the maximum frequency allowed by the current chip and packaging technologies this allows one to match the speed of an OC-192 line, i.e., the level 192 of the synchronous optical network (SONET) US hierarchy, i.e., 10 gigabits/s (equivalent to the European $64^{th}$ level of the Synchronous Digital Hierarchy or SDH and called STM-64) over each in and out port yielding to a 128 gigabits/s aggregate throughput switch.

On the other hand, another very important item that shapes the design of switch fabric devices is flow control. A very simple illustration of the need for a flow control mechanism in a switch is to observe that when more than one data packet attempts to access an output port simultaneously (all input ports may want to access the same output port at any given instant), then a conflict occurs. When this happens, only one of the contending packets can be read out. Other data packets either have to be stored in a buffer or queue, until they can actually be read out, or must be dropped. Although various buffering types are encountered, many of the recent switches have adopted output-queuing, that is, when a packet is arriving and handled in a switch, it is immediately placed in a queue that is dedicated to its outgoing port, where it waits until departing from the switch.

This approach will maximize the switch throughput provided that no input or output is oversubscribed. In this case, the switch is able to support the traffic and the queue occupancies remain bounded. In practice however, output-buffered switches are not free of complications. In particular, a N×N switch requires that the internal bandwidth be N times the input bandwidth. In addition the internal memory space needed in the switch fabric is limited by what the chip technology can reasonably permit (die size, which is by far the primary contributor setting the cost of a chip, limits the amount of internal memory that can be implemented). Under unfavorable traffic conditions, e.g., with a high degree of congestion, the limited on-chip memory has traditionally led to poor throughput, especially when FIFO (First In First Out) input queues are used at the input side of the switch fabric, i.e., in the input adapter, to store cells that could not be temporarily accepted by the switch fabric. This is bound to create a memory full status. Because simply deploying more on-chip memory to solve the problem is not economically feasible (even though memory cost has dramatically dropped over the years) a switch fabric end to end traffic management has thus become an essential aspect of a switch design to ensure that no packets are lost, due to congestion and high utilization, while warranting fairness regardless of the traffic patterns received through the input ports.

To this end, replacing the FIFO queues by VOQ's (Virtual Output Queue) in the input adapter, has contributed to eliminating the well-known HOL (head-of-line) input blocking problems encountered in switches that are also using input-queuing because VOQ provides that any packet in a queue, irrespective of its order of arrival, can be processed provided that the individual port output buffer, to which the packet is destined, is not full. However, the VOQ mechanism can only work if it has knowledge of the status of the output buffers, i.e., it must know which ones are full and which ones can still receive cells. This has necessitated the implementation, in the output adapter, of an output queue grant-based flow-control mechanism. This mechanism is aimed at passing a grant vector of N bits, one per output, over which classes of priority, handled by the switch, can be time-multiplexed. This is accomplished at the expense of having to add more signal I/O's to the switch fabric.

Much more on switching and switches can be found in the abundant literature that exists on the subject of switch architecture, their design and limitations and packet switching networks in general. For example, a good review of switches can be found in chapter 5 of "Asynchronous Transfer Mode Networks Performance Issues"by Raif O. Onvural, Artech House, 1995 and also in a publication by the International Technical Support Organization of IBM, Research Triangle Park, N.C. 27709, under the title "Asynchronous Transfer Mode (ATM) Technical Overview, no. SG24-4625, October 1995.

Therefore, commercially available fixed-size pack et switch fabrics are carefully crafted to best take advantage of all the capacities of current chip technologies, especially their intrinsic internal speed, while successfully avoiding the limitations imposed by the packaging, characterized by a scarcity of I/O resources and a drastic limitation in the number of inter-connections that would otherwise be necessary. The result is hardware having a maximum of a few tenths of ports (e.g., 16 or 32), running at very high-speed (e.g., OC-192 at 10 Gigabits/second) and capable of handling the full traffic of all ports without any loss thanks to a sophisticated flow control put in place to manage the congestion.

It practice however, it remains very difficult to take advantage of the full performance of every port. Not all applications require all ports to be of that speed. On the contrary, many applications of switch fabrics, even though they are attempting to utilize the full throughput capacity of the switch, require that a much larger number of lower-speed ports be accommodated in a switching box instead. Switch fabrics are expensive hardware. When building boxes, it is desirable to combine in the switch fabric port adapters a number of lower speed lines to reduce costs.

For example, a port adapter, instead of being connected to a single OC-192 line may have to be connected to four (independent) OC-48 lines each at 2.4 gigabits per second, or to sixteen OC-12 lines at 622 megabits per second, so as to implement a switching node comprised of a much larger number of ports, hereafter denominated sub-ports (since they are derived from a native switch fabric port). For example, implementing from a 16×16 switch fabric, a 256×256 switch box concentrating OC-12 lines or any other combination. Unfortunately, switch fabric ports do not scale down well because of the sophisticated flow control mechanism put in place (in an I/O constrained environment) to accommodate a single high-speed and which are unable to work well if many independent lower-speed line are connected to them instead. To illustrate this, a port adapter handling, e.g., four OC-48 lines, has no means to report a congestion occurring on a particular path, while others are not congested. The only solution is to report a global congestion for that port even though 3 lines out of 4 in this case could continue to receive traffic. This triggers a gross under-utilization of the capacity of the port and defeats the objective of trying to take advantage of the full switch capacity.

Therefore, it is a purpose of the invention to remedy the shortcomings of the prior art, as noted above, while fully taking advantage of the intrinsic performance of a N-port switch fabric used to build a M-port switching function concentrating, through port and sub-port adapters, the traffic of more than N lines.

It is another purpose of the invention to take into account the individual traffic of all sub-ports, indirectly connected to the switch fabric ports, thus enabling an overall flow control of a switching function irrespective of the physical organization of the core switch fabric in use.

It will be apparent to those skilled in the art having regard to this invention that other modifications of this invention beyond those specifically described here may be made without departing from the spirit of the invention. Accordingly, such modifications are considered within the scope of the invention as limited solely by the appended claims.

BRIEF SUMMARY OF THE INVENTION

A method and a system is disclosed for enabling a traffic flow control down to all sub-ports of a switching function made of a N-port core switch fabric. The switching function comprises one or more port adapters, each including one or more sub-port adapters. The invention assumes that, in each sub-port adapter, when a congestion is detected in aan OUT leg, it is reported through the corresponding IN leg. The detected congestion is piggybacked over the incoming traffic entering the input port of the N-port core switching fabric and coming from the IN leg sub-port adapter. In the N-port core switch fabric, the detected congestion is broadcast to all output ports. In turn, in each port adapter, the same information is broadcast to all sub-ports.

Then, in each sub-port adapter, a check is performed of whether the OUT leg of a Nth sub-port adapter is reported to be congested or not. If it is found to be congested, the sub-port adapter stops forwarding traffic destined for this Nth sub-port OUT leg and holds any further received traffic. The sub-port adapter keeps or resumes forwarding traffic, if any is received, destined for this Nth sub-port OUT leg as soon as it is reported to be not congested. All sub-port adapter congestion reporting is cycled through and acted on similarly.

Therefore, the invention provides the ability to take advantage of the full intrinsic performance of a N-port switch fabric used to build a M-port switching function by concentrating, through port and sub-port adapters, the traffic of more than N independent lines.

DETAILED DESCRIPTION OF THE INVENTION

Figure 1A:
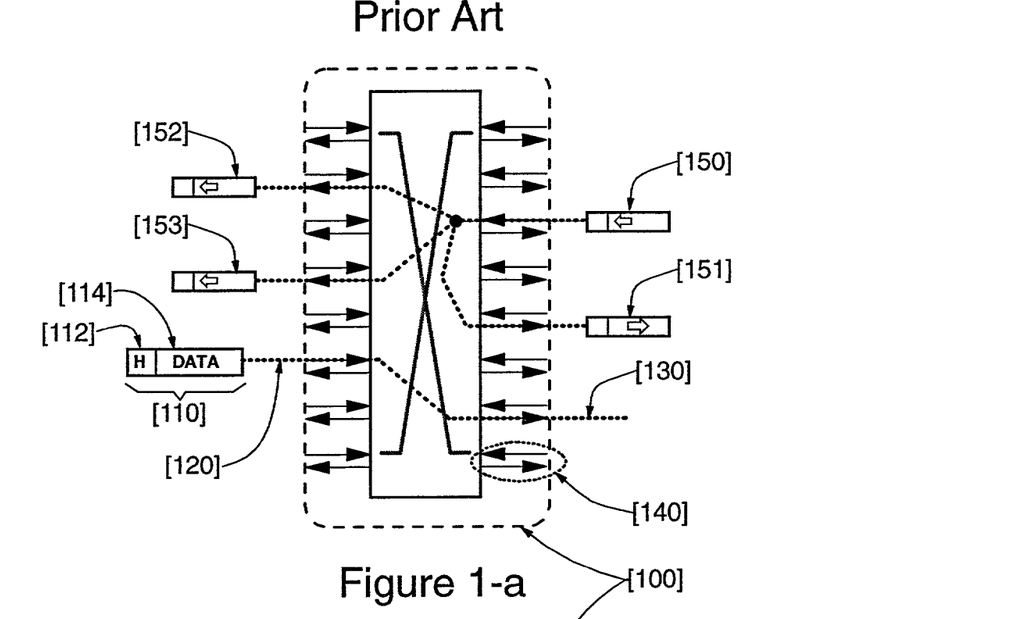
FIG. 1(a) is a schematic view of a fixed-size packet switch fabric capable of switching fixed-size packets.

FIG. 1 illustrates the prior art showing a high-performance switch fabric of the kind best suited to take advantage of the present invention. Referring to FIG. 1(a), there is shown a conceptual view of a fixed-size packet switch fabric 100 capable of switching a fixed-sized packet 110 (also often referred to as cell). Packets are comprised of a header 112 and a data part 114, i.e., the payload. Each packet transports a small (fixed-size) piece of the information exchanged by end- users. The header contains all the necessary information to properly handle and steer the packet through the switch fabric 100. That is, a packet entering the switch fabric through an input port 120 exits it through an output port 130. Ports are paired 140, including an input and an output port, so that data can flow in both directions along a path linking the end-users, possibly through many equivalent switch fabrics installed at nodes of a data communications network.

The switch fabric 100 shown here, as an example to illustrate the invention, is a 16×16 switch fabric. Any packet 110 entering it through an input port such as 120 can be directed to any of the 16 output ports such as 130. The switch fabric also has the built-in capability of replicating the same input packet e.g., 150; if instructed to do so in the packet header, over more than one port (up to 16 output ports) whenever a multi-cast or broadcast is necessary i.e., when a packet needs to be distributed to more than one destination in the network. This is illustrated here with a packet entering through input port 150 and replicated over the three output ports 151, 152, and 153.

Figure 1B:
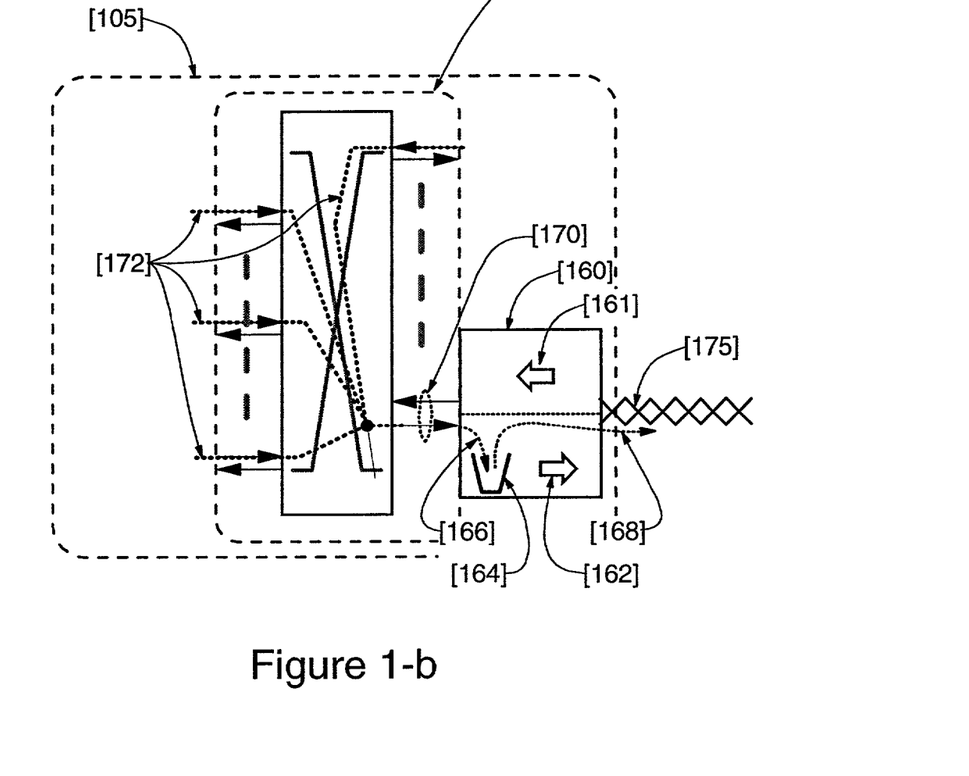
FIG. 1(b) is a schematic view representing that the switch fabric is in practice never used alone.

Referring to FIG. 1(b), it is illustrated that the switch fabric 100 is, in practice, never used alone. Each port pair is connected to a port adapter 160 having an IN leg 161 and an OUT leg 162. The port adapter, as the name suggests, is in charge of adapting a switch port 170 to a transmission medium (often a telecommunications line) 175 on the other end. As a typical example of the state of the art, the telecommunications line is an OC-192 optical fiber line, i.e., corresponding to the level 192 of the Synchronous Optical Network (SONET) US hierarchy, close to 10 gigabits/second (equivalent to the European 64$^{th}$ level of the Synchronous Digital Hierarchy or SDH and called STM-64). To be able to cope instantaneously with this steady state speed switch fabric port 170, the speed is made even higher and can reach, e.g., 16 gigabits/second.

Therefore, a switch fabric of the kind shown in FIG. 1 is designed to be capable of sustaining an aggregate throughput of 16×2×10 or 320 Gigabits per second while being capable of coping, at the switch fabric port, with an IN and OUT instantaneous throughput of 16 gigabits/second. Therefore, the egress buffer 164, which is always present in the output leg 162 of the adapter 160, may have to fill 166 at an instantaneous rate of 16 gigabits/s even though it is possibly drained out 168 at the maximum rate of the lines, i.e., 10 gigabits/second. It is then subject to overflow, especially when the input ports 172, possibly all, are sending traffic simultaneously to the same output port.

Figure 1C:
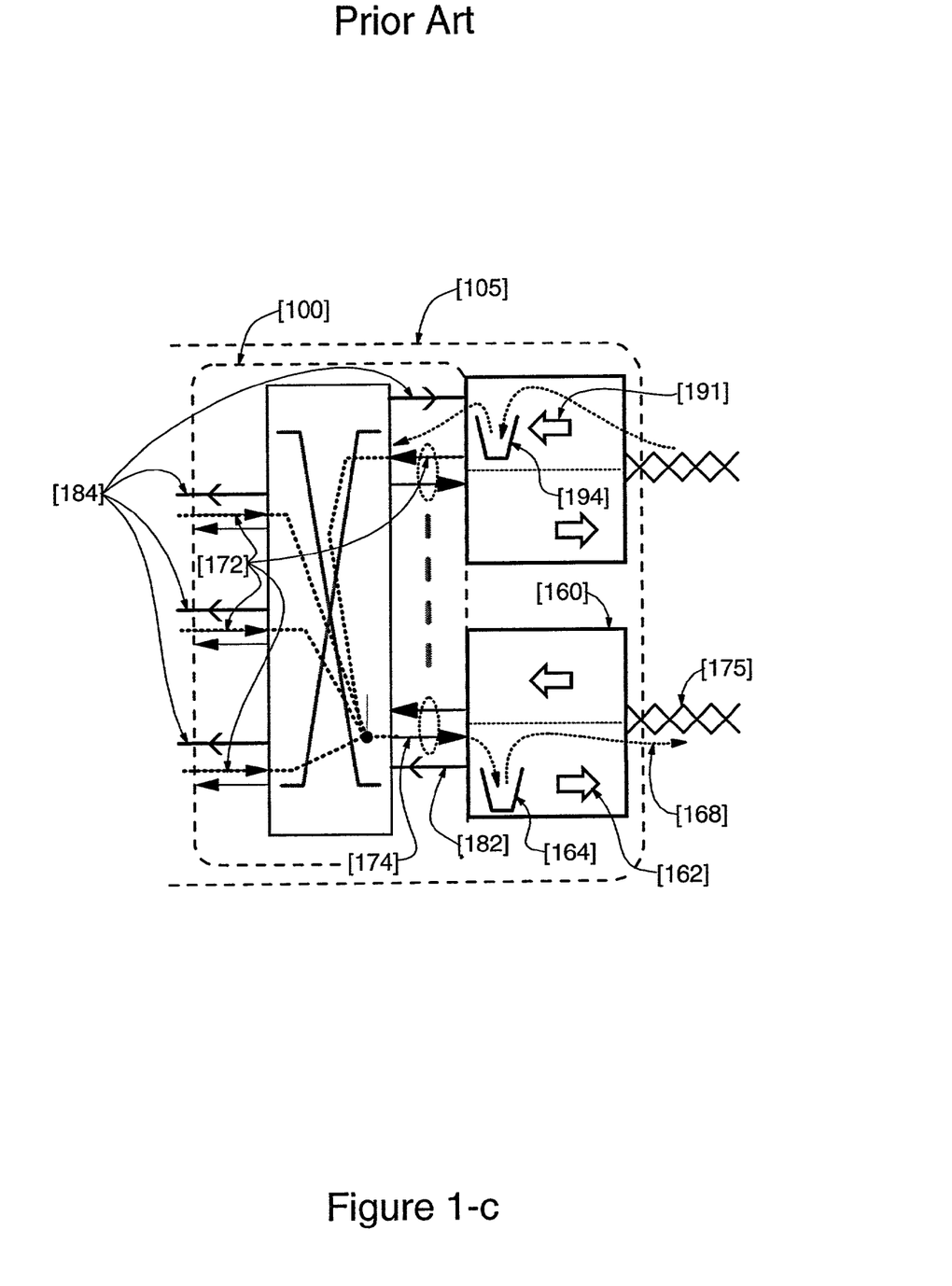
FIG. 1(c) is a schematic view illustrating the problems encountered with switching functions between switch fabric and surrounding port adapters.

Therefore, the switch fabric is typically part of a larger unit 105, e.g., a switching box to implement a network node, that may comprise up to 16 port-to-line adapters similar to the one shown 160 in this particular example. FIG. 1(c) illustrates with more detail one of the chief problem, briefly suggested above, encountered with all switching functions between the switch fabric and surrounding port adapters. Depending on the traffic characteristics at a given instant many, if not all, of the input ports 172 are receiving traffic for the same output port 174. If the aggregate traffic exceeds, for a significant period of time, what is drained out 168 through the line 175 connected to the adapter 160 then egress buffer 164 will eventually overflow and the corresponding packets are discarded.

Since there are stringent specifications on the number of packets that can be discarded in a network (all together no more than 1 over 1,000,000,000 packets are allowed to be discarded) all modem switches have flow control mechanisms intended to prevent this from occurring. Whenever the OUT leg 162 of a port adapter 160 detects that its internal buffering is near capacity it raises a signal 182 to the switch fabric 100 indicating it can no longer accept incoming traffic for that port. The switch traffic must hold what it has already received, in the switch fabric itself, for that port (if the switch has provisions to do so). More importantly, it broadcasts 184 to all IN legs of port adapters, such as 191, the information that it cannot accept traffic for that particular output 174. This information is then used by all the adapters (actually, by all adapters receiving traffic for that particular port) to hold it in their internal buffering. This is generally implemented under the form of a FIFO (first in first out) or with a more sophisticated VOQ (virtual output queue) 194, this latter approach avoiding the well-known HOL (head of line) blocking observed when FIFO's are used. With a FIFO, when a packet cannot be delivered because the output port it must exit through is busy, all other packets, waiting in line behind, cannot be processed even though the ports through which they have to exit are idle. VOQ avoids this problem.

There are numerous ways to handle congestion from an output port which is reported and acted on within the switch fabric and the switching functions. The methods vary with the numerous different implementations found of these functions. The disclosed invention does not depend, as will be explained later in the description, on the particular mechanism implemented in the switch fabric to be fully effective. Irrespective of the details of a particular solution retained to implement a switch, the idea is always the same. That is, in a switching function 105 all the parties involved are made aware, through a specific flow control mechanism, of an output port congestion.

From the many alternative possibilities known in the prior art, FIG. 1 illustrates an example where the use of signals 182 and 184 raised respectively to the switch fabric and, through the switch fabric, are broadcast to all port adapters to inform them of a congestion occurring at some of the port outputs. The objective is to be able to use the switching function internal buffering 105, including switch fabric 100 (if the switch fabric has provisions for temporarily holding packets, i.e., if it is more than just a switch matrix or crossbar) and port adapter IN and OUT buffering 164 and 194, to their full extent, in an attempt to prevent any discarding from happening or to delay this event as much as possible, and to accomplish this without impairing the traffic of non-congested ports.

In an even more global approach to solving congestion in a communications network it is worth noting here that some communications protocols may further handle this mechanism by permitting the remote source of data to be eventually informed of a slowing down in case of severe and/or long congestion. An example is the case of ATM (Asynchronous Transfer Mode) networks implementing an adaptive flow control mechanism known under the name of ABR (Available Bit Rate), a service specified by the ATM Forum Traffic Management Sub-working Group. In this case one of the roles of an adapter such as 160 is to inform the remote source, through the appropriate mechanism of the protocol in use, that it has to pace the sending of data to prevent discarding.

Figure 2:
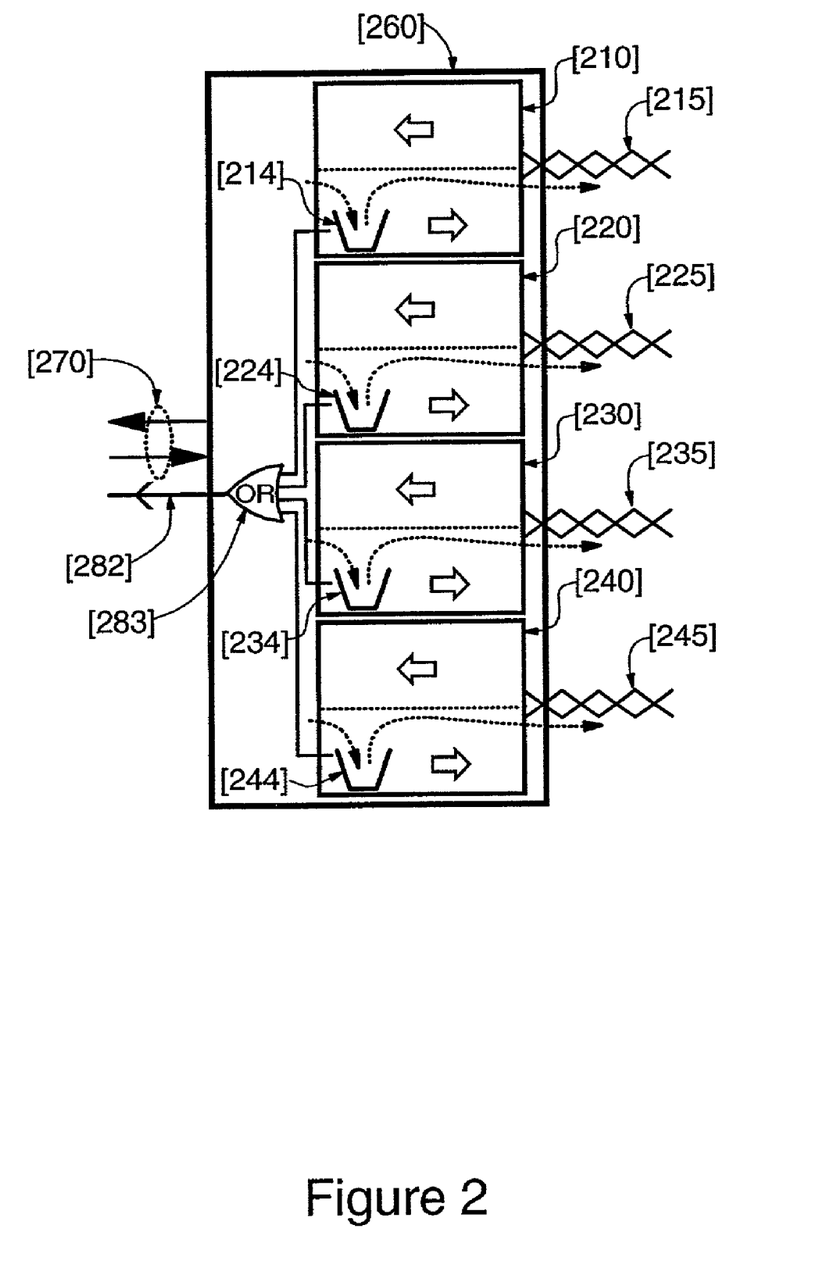
FIG. 2 is a schematic view further illustrating the problem solved by the disclosed invention.

FIG. 2 illustrates the problem, solved by the disclosed invention, and which arises when an adapter 260 is designed to interface more than a single communication line. Although any number of slower lines may have to be handled, 4 or 16 lines (whose aggregate throughput must stay within a single line discussed in previous figure) are typical examples of what may be needed in actual implementation. Four sub-port adapters 210, 220, 230, and 240 are used in this example to illustrate the problem. Specifically, if communication line 175 of FIG. 1 was an OC- 192 optical fiber line at 10 Gigabits/second, then the four lines 215, 225, 235 and 245 are, e.g., OC-48 lines at 2.48 Gigabits/sec each. Often in practice, due to the fact that the switch fabric are very high performance pieces of hardware implemented in an I/O constrained packaging environment, as discussed in the background section, a switch fabric port 270 has far too much performance (16 Gigabits/second was assumed in FIG. 1) to accommodate a single communication line 215. Therefore, in order to take full benefit of this performance, lower speed lines are grouped on the same port adapter 260 so as to keep the switching unit cost performance ratio competitive.

However, this creates a very serious problem since there is now more than a single line on the same port adapter and only one path 282 for reporting congestion to and through the switch fabric as explained in FIG. 1. The conventional solution to overcome this results in poor performance. If the filling of the four egress buffers 214, 224, 234, and 244 is OR'ed 283 to report a congestion the consequence is that any congestion affecting a line prevents all the other lines from being able to forward any traffic at all. Therefore, the objective in this example of allowing four independent lower-speed lines to interface through a single full-speed port 270 is not met since the lines are not really independent.

Even if a more sophisticated approach is considered in which a single egress buffer is maintained for the four lines, so as to share dynamically a globally larger resource between the four lines and thereby attributing a larger share to a line when necessary; this can only delay the occurrence of the problem in the case of a long congestion on one line. Moreover, because the speed of the switch fabric port 270 stays the same, i.e., 16 Gigabits/second in this example, for a while all traffic can have the same sub-port and lower-speed line as a target thus exacerbating the problem. Therefore, such a switch fabric does not really scale down. Ideally it should permit, as a building block, the construction of a box not only concentrating traffic solely from the higher-speed lines it can accommodate but also from many more lower-speed lines, when required to fulfill the specifications of a particular application, yet permitting flow control independently over each of those lower-speed lines and sub-ports.

Figure 3:
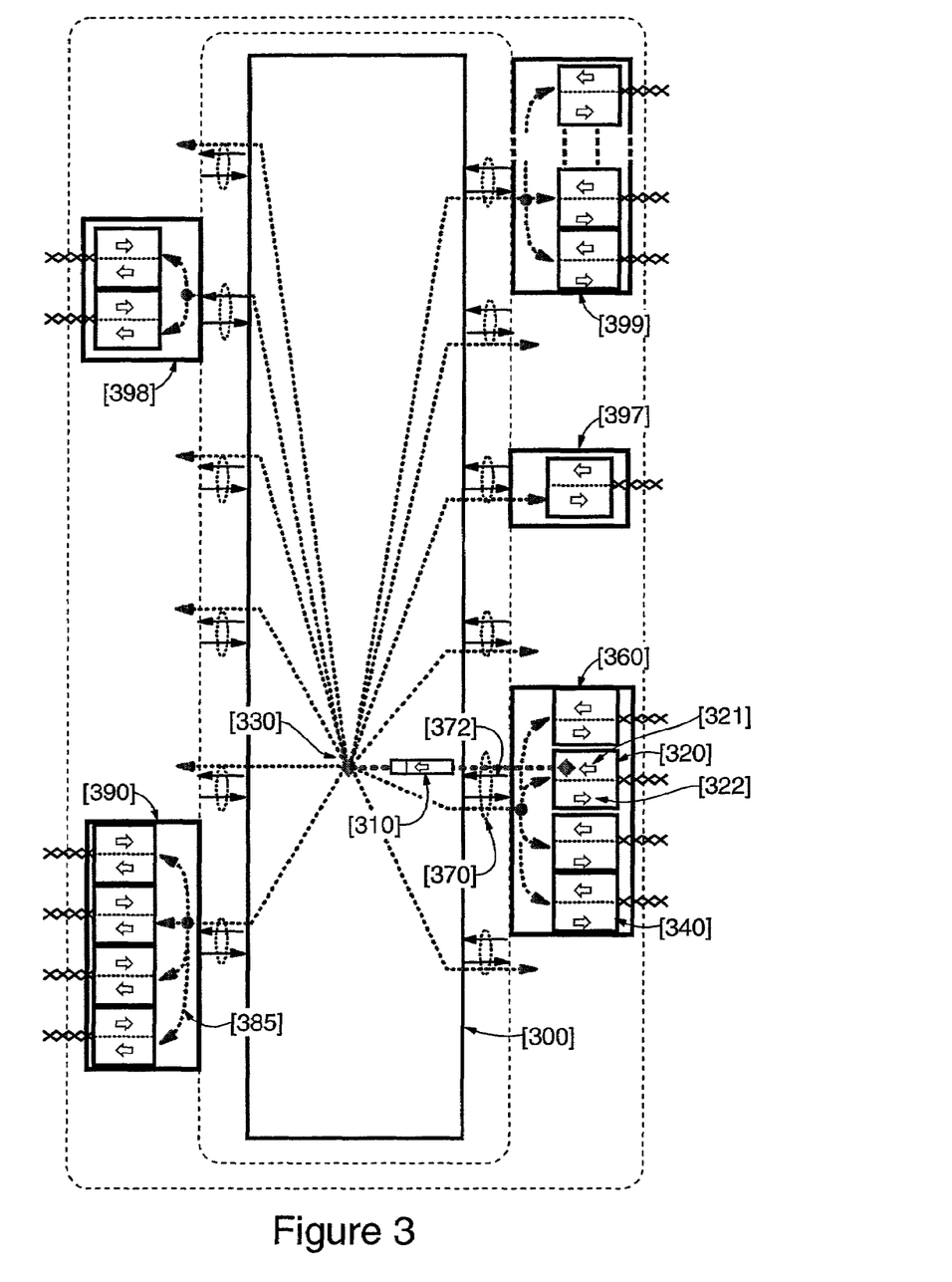
FIG. 3 is a schematic view illustrating the disclosed invention.

FIG. 3 depicts the solution to this problem disclosed by the Applicants' invention. When too much traffic converges towards an OUT leg 322, of a sub-port adapter 320, packets received through the IN leg 321, entering switch fabric through input port 372, are piggybacked with the information that the corresponding OUT leg is becoming congested. The information, contained in the header of each entering packet 310, is then broadcast 330 within the switch fabric 300 core of the switching function 305 to all its output ports through the same means, that is, all packets exiting switch fabric output ports start carrying the information that OUT leg of sub-port adapter 320 in global adapter 360 of switch fabric port 370 is becoming congested. In turn all sub-port adapters such as 390 are thus updated 385 with the same information. Consequently, all entities that may have to forward traffic to the congested sub-port OUT leg 322 are made aware of the fact that the sub-port is congested and they should withhold the sending of more data to this direction. It is worth noting that each sub-port adapter 340, part of the global adapter 360 from which the congestion is reported (by sub-port adapter 320) are made aware through the exact same mechanism even though they are located on the same switch fabric adapter and could be informed directly, thereby avoiding the expense of uselessly introducing a different mechanism for reporting congestion.

Although the mechanism of the invention is mainly discussed around global adapters such as 390 and 360, each implementing four sub-ports, it would be apparent to those skilled in the art that any number of such sub-ports can potentially be accommodated, as shown with 398 and 399, while their aggregate throughput should stay below the one supported by a switch fabric port.

In addition, it is understood that the disclosed invention is also applicable where all adapters have multiple sub-ports. In other words, the invention works as well in the general case where some of the port adapter are single sub-ports as shown with 397.

Figure 4:
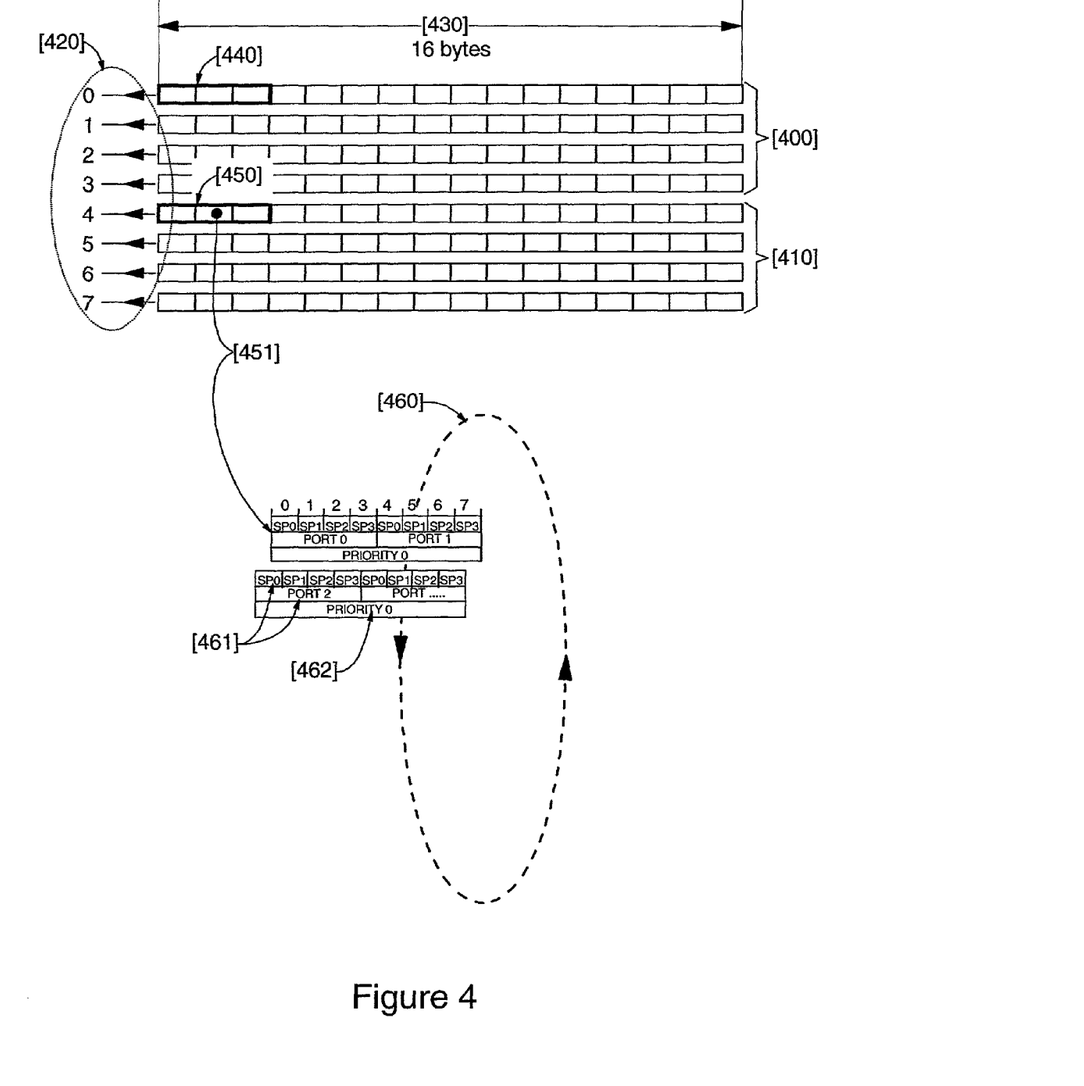
FIG. 4 is a schematic view illustrating the transport of the flow control information within a switch fabric.

Referring to FIG. 4 there is illustrated a preferred embodiment of the invention, the transport of the flow control information within a switch fabric. It is assumed in this example that the switch port are operated in a two-way link bundling mode, that is, over each port two 64-byte packets 400, 410 are processed simultaneously in order to obtain the required level of performance. In this example of the invention assumed to be 16 gigabits/sec for each IN and OUT port. Each IN or OUT port is actually made of 8 individual links 420, indexed from 0 to 7, each capable of toggling at a rate of 2 gigabits/second. The higher rate can be accommodated with the current packaging and chip technologies currently available. Therefore, two 64-byte packets are transferred over 8 links in 16 one-byte transfers 430. Each packet has its header part 440, 450. One byte 451 being devoted to the transfer of the flow control information down to the sub-ports. Since a byte is insufficient to transport the flow control information about all sub-ports, this latter is time multiplexed over a continuous set of packets.

It is noted here that ports are never actually idle. Even though there is no data to be transferred over a particular port, idle packets 402 are transferred instead of data packets 404. Idle packets are useful for keeping these very high-speed links in synch and the header bytes such as 451 can continue moving the information necessary to properly operate the switch and adapters such as the flow control herein discussed.

Thus, depending on the number of ports of the switch fabric and the number of sub-ports to be supported in a specific application, among many possible alternate solutions, a flywheel mechanism 460 is put in place so as, over a contiguous set of packets, each individual participant (i.e., the switch fabric as a whole and all the adapters down to the sub-ports) is kept updated of the congestion status of all other actors. The flywheel mechanism 460 cycles through every port and sub-port 461 and possibly through every traffic priority class 462 supported by the switching function (most of the time classes of traffic are also supported in order to give precedence to priority flows and discard lower priorities first in case of congestion). The only assumption on which the disclosed invention rests is that the switch fabric is capable of internally performing a broadcast of the flow control, especially byte 451 in this particular example, from any switch fabric port to any other switch fabric port, (as shown in FIG. 3) so as all adapters and sub-port adapter can actually be updated.

Figure 5:
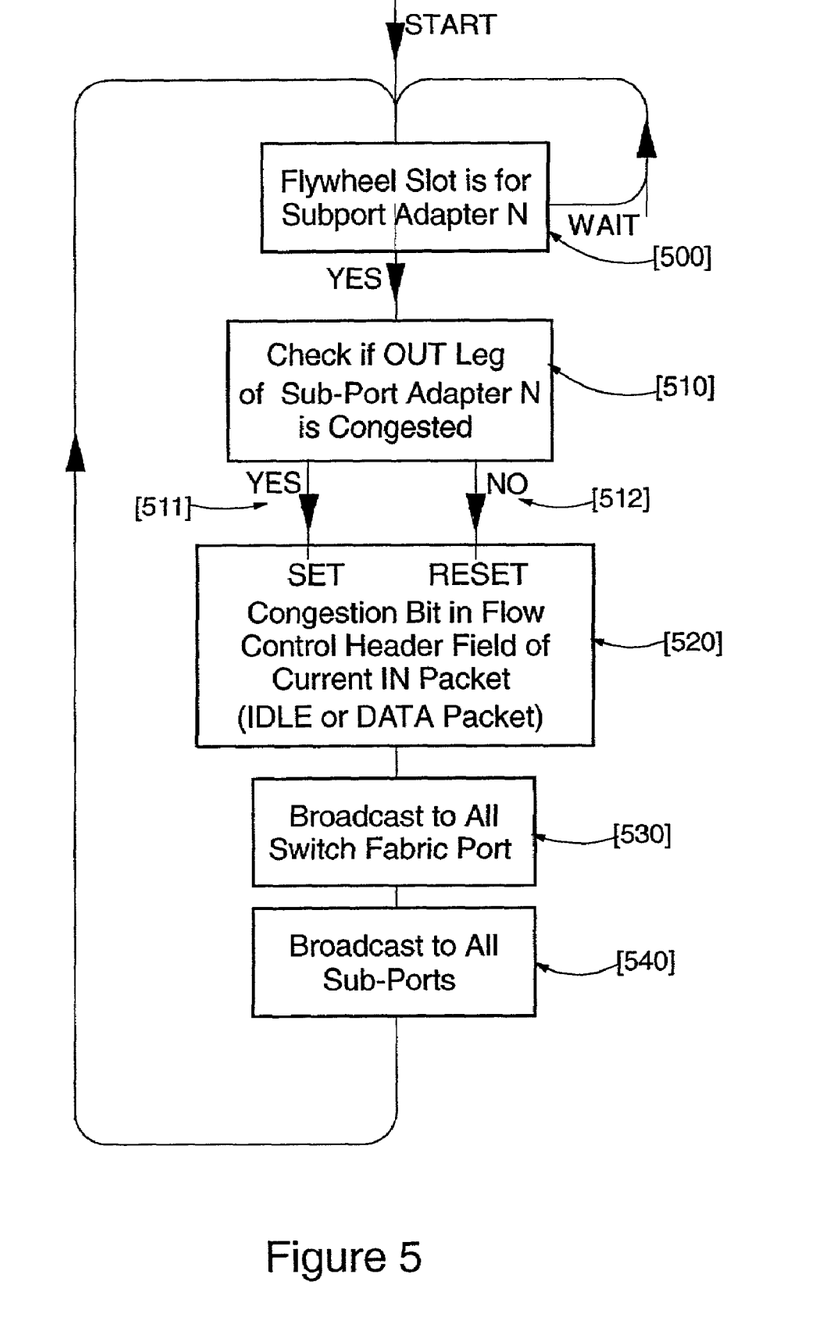
FIG. 5 is a flow chart of the disclosed method.

FIG. 5 illustrates the steps of the method per the disclosed invention in a sub-port adapter. When there is a slot in the flywheel for the sub-port considered then the OUT leg is checked 510 to determine if it is congested. This check is performed according to whatever criterion has been retained for that purpose. If the answer is positive 511 the corresponding congestion bit are sent in the current IN packet 520 ready to enter the switch fabric from the IN leg. This may be a true data packet (i.e., carrying end-user data) or just an idle packet if there is nothing to send. If no congestion is detected the congestion bit is reset. This information is broadcast 530 first to all switch fabric ports (within the switch fabric) and from all outports to all sub-ports 540 in every global adapter. Thus, all sub-ports are eventually made aware of a congestion that has occurred in the OUT leg of a particular sub-port adapter.

Figure 6:
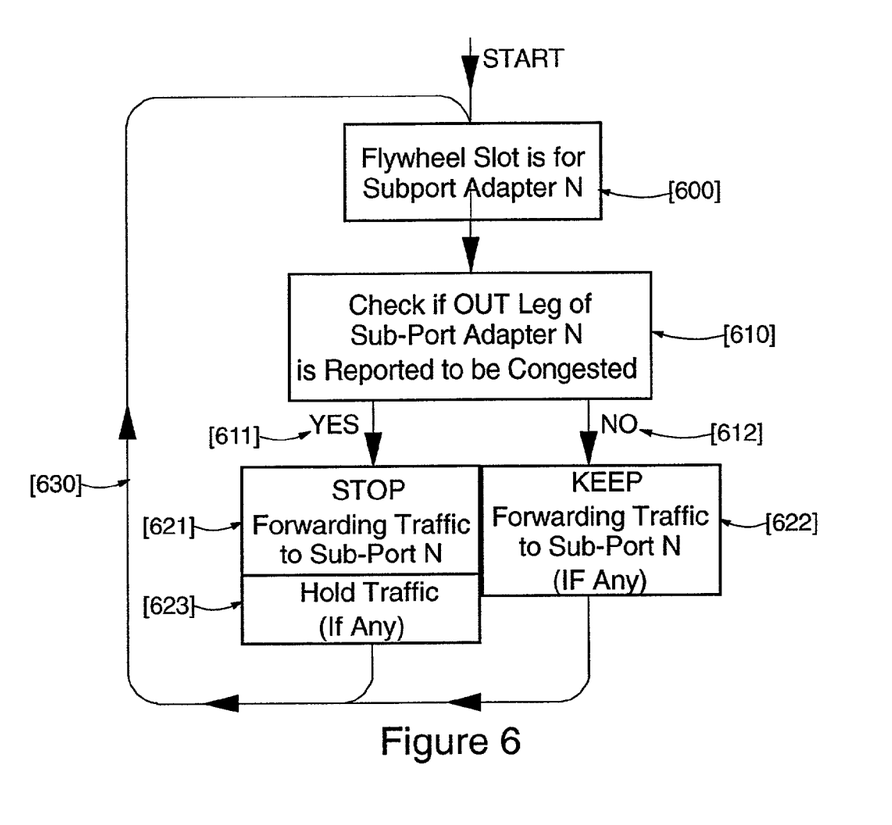
FIG. 6 is a flow chart of the disclosed method illustrating congestion status.

FIG. 6 further describes the method of the disclosed invention illustrating that the congestion status concerning every OUT leg sub-port adapter is reported and checked 610 in turn, depending upon what the slot flywheel 600 delivers. If the reported sub-port OUT leg is congested 611, then the sub-port adapter in which the checking is performed must stop 621 forwarding traffic to the congested sub-port and may have to hold 623 the traffic it has for that destination and hold further traffic if any is received. Alternatively, if the destination is not congested 612 then the forwarding of traffic 622 is continued if any is received. All sub-ports are kept cycling through 630.

Figure 7:
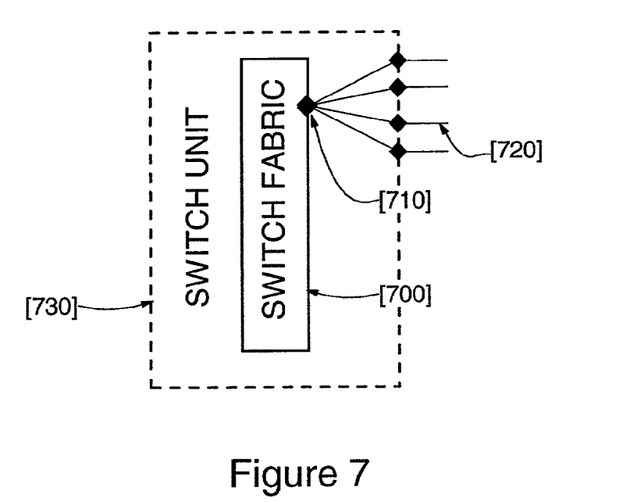
FIG. 7 is a schematic of a system per the disclosed invention using a N×N port core switch fabric.

FIG. 7 illustrates an embodiment of the disclosed invention using a N×N port core switch fabric 700 having N IN and OUT ports 710, and allowing expansion into a M×M switching unit 730 (with M larger N) while providing the capability for flow control down to the sub-ports, such as 720, so that a greater number of slower ports can be implemented, without having to compromise, from a very high-speed switch fabric used as a building block.

What is claimed is:

1. A method for enabling a traffic flow control down to all sub-ports of a switching function made of a N-port core switch fabric, said switching function comprising one or more port adapters, each said port adapter including one or more sub-port adapters, said method comprising the steps of:

in each said sub-port adapter,
detecting congestion in an OUT leg of said sub-port adapter;
reporting said detected congestion through an IN leg of said sub-port adapter, said step of reporting further including the step of:
piggyback conveying said detected congestion over an incoming traffic entering an input port of said N-port core switching fabric from said IN leg of said sub-port adapter;
in said N-port core switch fabric:
broadcasting said detected congestion to all output ports;
in each said port adapter,
broadcasting said detected congestion to all sub-ports, thereby informing all said sub-port adapters of said detected congestion in any one of said OUT leg.

2. The method of claim 1 further comprising the steps of:
in each said sub-port adapter, checking whether said OUT leg of a Nth sub-port adapter is reported to be congested or not;
if congested, stop forwarding traffic destined for said OUT leg of said Nth sub-port adapter, said stopping step further comprising the step of:
holding traffic in said sub-port adapter if any is received;
if not congested, continue or resume forwarding traffic, if any received,
destined for said OUT leg of said sub-port adapter;
continuing to cycle through each reported said sub-port adapter repeating all here above described steps.

3. The method of claim 1 wherein said N-port core switch fabric is switching fixed-size packets.

4. The method of claim 3 wherein said fixed-size packets, moved through the ports of said N-port core switch fabric, include fixed-size idle packets.

5. The method of claim 3 wherein more than a single fixed-size packet are moved simultaneously through each port of said N-port core switch fabric.

6. The method of claim 3 wherein the step of piggyback conveying said detected congestion is performed in a header field of said fixed-size packets.

7. The method of claim 4 wherein the step of piggyback conveying said detected congestion over said incoming traffic is carried out including a fixed-size idle packet.

8. The method of claim 6 wherein the step of reporting said detected congestion of all said sub-port adapters is time multiplexed in said header field.

9. The method of claim 1 wherein the reporting step includes reporting per priority class.

10. A switching system expanding the number of ports of a switch fabric comprising
a N-port core switch fabric,
one or more port adapters, each said port adapter including one or more sub-port adapters,
in each said sub-port adapter,
means for detecting congestion in an OUT leg of said sub-port adapter;
means for reporting said detected congestion through an IN leg of said sub-port adapter, said reporting means further comprising:
means for piggyback conveying said detected congestion over an incoming traffic entering an input port of said N-port core switching fabric from said IN leg of said sub-port adapter;
in said N-port core switch fabric:
means for broadcasting said detected congestion to all output ports;
in each said port adapter, means for broadcasting said detected congestion to all sub-ports, thereby informing all said sub-port adapters of said detected congestion in any one of said OUT leg.

11. The switching system of claim 10 further comprising:
in each said subport adapter, means for checking whether said OUT leg of a Nth sub-port adapter is reported to be congested or not;
if congested, means to stop forwarding traffic destined for said OUT leg of said Nth sub-port adapter, said stopping means further comprising,
means for holding traffic in said sub-port adapter if any is received;
if not congested, means to continue or resume forwarding traffic, if any received, destined for said OUT leg of said sub-port adapter;
means for continuing to cycle through each reported said sub-port adapter repeating all here above described steps.

12. The switching system of claim 10 wherein said N-port core switch fabric is switching fixed-size packets.

13. The switching system of claim 12 wherein said fixed-size packets, moved through the ports of said N-port core switch fabric, include fixed-size idle packets.

14. The switching system of claim 12 wherein more than a single fixed-size packet are moved simultaneously through each port of said N-port core switch fabric.

15. The switching system of claim 12 wherein said means for piggyback conveying said detected congestion is performed in a header field of said fixed-size packets.

16. The switching system of claim 13 wherein said means for piggyback conveying said detected congestion over said incoming traffic is carried out including said fixed-size idle packets.

17. The switching system of claim 15 wherein said means for reporting said detected congestion of all said sub-part adapters is time multiplexed in said header field.

18. The switching system of claim 10 wherein said reporting means includes reporting per priority class.

19. A program storage device readable by a machine, tangibly embodying a program of instructions executable by the machine to perform method steps for enabling a traffic flow control down to all sub-ports of a switching function made of a N-port core switch fabric, said switching function comprising one or more port adapters, each said port adapter including one or mare sub-port adapters, said method steps comprising:
in each sub-port adapter,
detecting congestion in an OUT leg of said sub-port adapter;
reporting said detected congestion through an IN leg of said sub-port adapter, said step of reporting further including the step of:
piggyback conveying said detected congestion over an incoming traffic entering an input port of said N-port core switching fabric from said IN leg of said sub-port adapter;
in said N-port core switch fabric:
broadcasting said detected congestion to all output ports;
in each said part adapter,
broadcasting said detected congestion to all sub-ports, thereby informing all said sub-port adapters of said detected congestion in any one of said OUT leg.

20. The program storage device of claim 19 further comprising the steps of:
in each said sub-port adapter, checking whether said OUT leg of a Nth sub-port adapter is reported to be congested or not;
if congested, stop forwarding traffic destined for said OUT leg of said Nth sub-part adapter, said stopping step further comprising the step of:
holding traffic in said sub-port adapter if any is received;
if not congested, continue or resume forwarding traffic, if any received, destined for said OUT leg of said sub-port adapter;
continuing to cycle through each reported said sub-port adapter repeating all here above described steps.

21. The program storage device of claim 19 wherein said N-port core switch fabric is switching fixed-size packets.

22. The program storage device of claim 21 wherein said fixed-size packets, moved through the ports of said N-port core switch fabric, include fixed-size idle packets.

23. The program storage device of claim 21 wherein more than a single fixed-size packet are moved simultaneously through each port of said N-port core switch fabric.

24. The program storage device of claim 21 wherein the step of piggyback conveying said detected congestion is performed in a header field of said fixed-size packets.

25. The program storage device of claim 22 wherein the step of piggyback conveying said detected congestion over said incoming traffic is carried out including said fixed-size idle packets.

26. The program storage device of claim 24 wherein the step of reporting said detected congestion of all said sub-port adapters is time multiplexed in said header field.

27. The program storage device of claim 19 wherein the reporting step includes reporting per priority class.

* * * * *